Dec. 20, 1938.  T. ZUSCHLAG  2,140,662
ELECTRICAL MEASUREMENT
Filed April 14, 1937   2 Sheets-Sheet 1

INVENTOR
Theodor Zuschlag
BY
ATTORNEYS

Dec. 20, 1938.   T. ZUSCHLAG   2,140,662
ELECTRICAL MEASUREMENT
Filed April 14, 1937   2 Sheets-Sheet 2
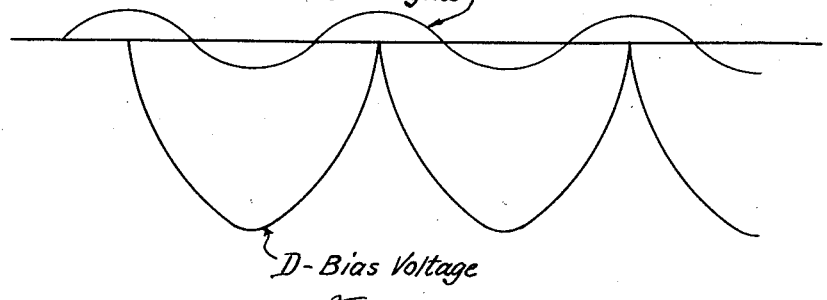
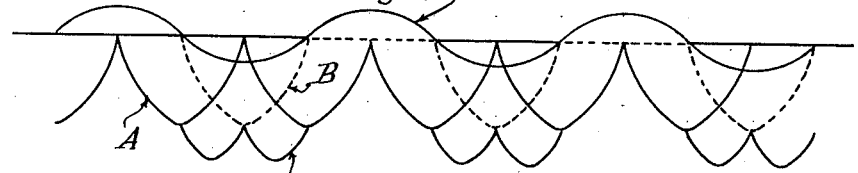
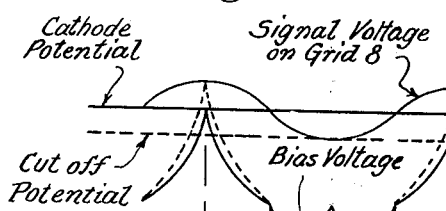
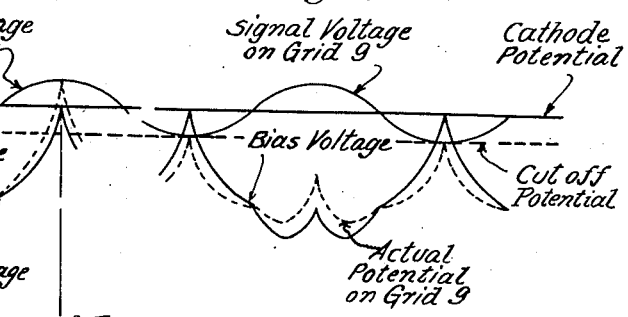
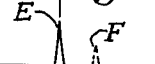
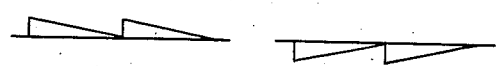
INVENTOR
Theodor Zuschlag
BY
ATTORNEYS Patented Dec. 20, 1938

2,140,662

UNITED STATES PATENT OFFICE 2,140,662

ELECTRICAL MEASUREMENT

Theodor Zuschlag, West Englewood, N. J., assignor to Magnetic Analysis Corporation, Long Island City, N. Y., a corporation of New York Application April 14, 1937, Serial No. 136,825

21 Claims. (Cl. 175—183)

This invention relates to electrical measurement and in particular to the determination of wave forms of alternating electrical quantities by a so-called "point contact" method.

It is the object of the invention to increase the precision with which a determination of the wave form of an alternating current or voltage may be made and at the same time to reduce the cost and complexity of the required apparatus.

To this end, I provide novel electronic means of supplying the necessary "point contact", and thus supply to the indicating or recording instrument an impulse of extremely brief duration and of amplitude substantially directly proportional to the amplitude of the wave form under investigation. I also povide novel balancing means whereby a null method may be employed with resulting increased sensitivity. Furthermore, I provide a novel circuit of improved sensitivity characteristic such that the range within which the apparatus is capable of operating is greatly extended.

The fundamental principles of the contact method of wave form determination are described in Laws' "Electrical Measurements", 1st ed., 1917, chap. 14. Briefly, that method involves supplying to an indicating or recording instrument an impulse whose duration is as brief as possible and whose amplitude is proportional to the amplitude of the wave form to be determined at a particular instant. Heretofore, such impulse has been obtained by the use of a synchronously rotating contactor which makes an electric connection between a source of voltage whose wave form is to be determined and an indicating instrument. Successive points of the wave are obtained by noting the deflection of the indicating instrument for successive phase positions of the contactor.

Serious difficulties accompany the transmission of the momentary electrical impulses across the rapidly rotating contactor, and injury to the contacts either by mechanical wear or by sparkling results in false indications of wave form. Furthermore, the use of any rapidly rotating mechanism places narrow limits on the frequencies at which the method may be employed as well as introducing obvious practical objections such as wear of bearings and mechanical vibration.

In some connections, small differences in wave form may have important significance, and these differences may occur in the neighborhood either of the zeros or of the peaks of the wave. It is therefore essential that the apparatus be accurate and linear and that it be so between wide amplitude limits of the quantity to which it responds. This severe requirement is not met by most apparatus heretofore known.

That this invention provides a simple improved method of determining with great precision the wave form of an alternating current or voltage and an inexpensive rugged apparatus for carrying it out, will be seen from the following detailed description taken in connection with the drawings in which:

Fig. 2 illustrates how a full-wave rectified voltage of proper frequency may be employed to produce the required grid bias.

Fig. 3 illustrates another and preferred bias-producing voltage, formed by the addition in proper phase relation of a full-wave rectified voltage of the signal frequency and a half-wave rectified voltage of the same frequency.

Figs. 4 and 5 illustrate the grid potential of a vacuum tube resulting from the addition thereon of a voltage to be analyzed and an auxiliary biasing voltage, under two different phase conditions.

Fig. 6 illustrates the wave form of the current fluctuations in the detector anode circuit of the apparatus of Fig. 1, in one modification.

Fig. 7 illustrates the wave form of the voltage fluctuations between detector anodes in the apparatus of Fig. 1 in a preferred modification.

Figure 1:
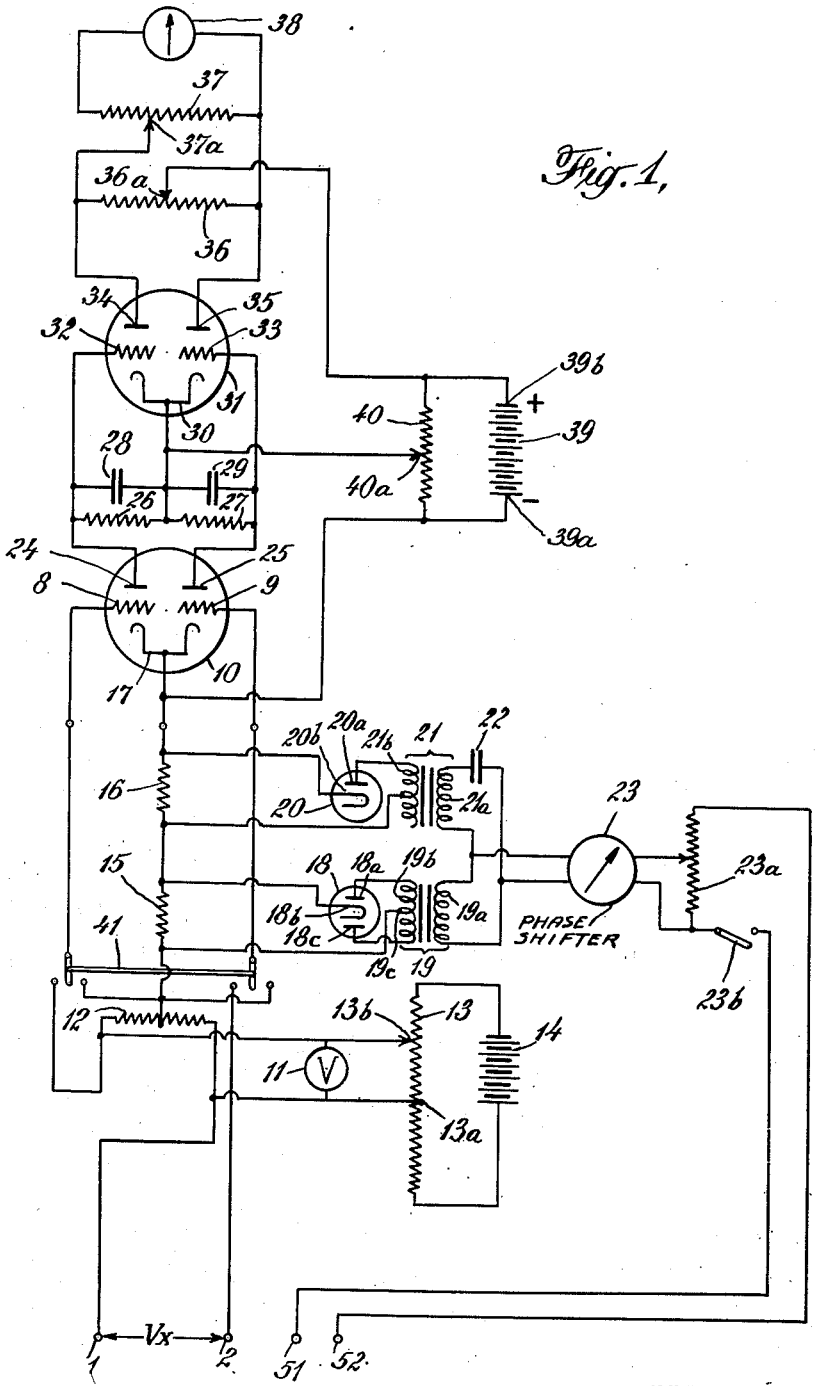
Fig. 1 is a circuit diagram of a presently preferred form of the apparatus of my invention.

Referring now to Fig. 1, a voltage $Vx$, the wave form of which is to be determined, is impressed across terminals 1, 2. Terminal 1 is connected to one end of a center tapped resistor 12, the other end of which is connected to one point of a two-gang two-way switch 41. The other terminal, 2, is connected to another point of the same switch 41.

An external source of direct current energy 14, which may be of any convenient form, is connected to a resistor 13 having a center tap 13a and a movable contact 13b. The center tap and movable contact are connected to the two ends, respectively, of a resistor 12, across which is also connected a voltmeter 11.

The center tap of the resistor 12 is connected through resistors 15 and 16 in series to cathodes 17 of a tube 10. When the switch 41 is thrown in one direction (to the left in Fig. 1) the voltage to be investigated is connected in series with the resistor 12 to grids 8 and 9 of the tube 10.

Plates 24 and 25 of the tube 10 are connected together through like resistors 26 and 27. Condenser 28 is connected across resistor 26, and condenser 29 is connected across resistor 27.

An external source of direct-current energy 39 is connected to a resistor 40 having a movable contact 40a. The low potential terminal 39a of the source 39 is connected to the cathodes 17 and the movable contact 40a is connected to the common point of the resistors 26 and 27.

The tube 10 is shown as a twin vacuum tube having its cathodes 17 connected together and its control grids and plates connected as above described. If desired, it may be replaced by two simple vacuum tubes, the cathodes thereof being connected together and the remaining connections being as shown in Fig. 1. It may also be replaced by a tube or tubes of more complex construction, or by any form of balanced detector, as will be understood by those skilled in the art.

Grids 32 and 33 of an amplifier tube 31 are connected respectively to the plates 24 and 25 of the tube 10 and cathodes 30 of the tube 31 are connected together and to the common point of the plate resistors 26 and 27. A resistor 36, having a movable contact 36a, is connected across the plates 34 and 35 of the tube 31. The movable contact 36a is connected to the high potential end 39b of the external source 39, and the cathodes 30 are connected to the movable contact 40a. As in the case of the twin tube 10, the twin tube 31 may be replaced by any desired form of balanced amplifier.

The two terminals of a sensitive D. C. milliammeter or galvanometer 38 are connected respectively to the ends of a resistor 37 having a movable contact 37a. The movable contact 37a and one end of the resistor 37 are connected respectively to the plates 34 and 35 of the tube 31.

Across main power terminals 51 and 52 is connected (through a switch 23b and a potentiometer 23a) a phase-shifting device 23. Since the phase-shifting device draws but little power, a resistor is not objectionable for this purpose, although it may be replaced by a reactor if desired. (The phase shifting device may be connected across the input terminals 1, 2 instead of to a separate power source, but this is not desirable because it may result in distorting the wave form of the electrical impulse undergoing investigation.)

The phase-shifting device may be of any desired construction but it has been found that the device commercially available under the name of a phase-shifting transformer operates satisfactorily. The output terminals of the phase-shifting device 23 are connected to a primary winding 19a of a first transformer 19 and also, through a condenser 22, to a primary winding 21a of a second transformer 21. A secondary winding 19b of the transformer 19 is connected by its ends to the plates 18a, 18c of a full-wave rectifier tube 18. A center tap 19c of the secondary winding 19b and a cathode 18b of the tube 18 are connected respectively to the two ends of the resistor 15. Of the secondary winding 21b of the transformer 21, one terminal is connected to a plate 20a of a half-wave rectifier tube 20 and the other terminal is connected to one end of the resistor 16. The other end of the resistor 16 is connected to a cathode 20b of the tube 20.

The operation of the circuit of Fig. 1 will now be described.

If an alternating electric signal voltage be impressed on the input terminals 1 and 2, as, for example, by connecting them to the ends of a resistor through which an alternating current is flowing, or, again, by connecting them directly to the terminals of a generator, this alternating voltage will appear between the switches 41. If these switches be thrown to the left, switch 23b being open, equal and opposite alternating voltages will be impressed on the grids 8 and 9. These grids will then respectively control the currents flowing to the plates 24 and 25, and an alternating current will flow through the resistors 26 and 27 and the condensers 28 and 29 in parallel. Since the grid voltages are balanced, however, no D. C. voltage will appear across the plates 24 and 25, unless in the unusual case where the signal voltage contains a direct current component, and therefore none will appear across the grids 32 and 33 of tube 31, but only the alternating signal voltage as amplified by the tube 10.

Similarly, an amplified alternating voltage will appear across the resistor 36, but if the system is balanced, no direct voltage will appear across this resistor. Under these conditions, the D. C. milliammeter 38 will read zero current at all times.

Adjustments for balance and sensitivity of the system are made when the signal voltage is removed from the grids, the latter being short-circuited by throwing switch 41 to the right, the grid bias voltage being impressed on the grids in parallel, switch 23b being closed for this purpose.

In order to effect this adjustment, movable contact 36a should be slightly displaced. This will cause a small direct voltage to appear across resistor 36 which will be manifested by a deflection of galvanometer 38. Movable contact 40a, which governs the plate potentials of tubes 10 and 31 should then be adjusted until this deflection is a maximum. If the deflection should be so great as to drive the moving element off scale, movable contact 36a should be further adjusted until the deflection is reduced, and adjustment of movable contact 40a repeated until conditions of greatest sensitivity of the amplifier tubes 10 and 31 are reached. Movable contact 36a should then be readjusted until, even under conditions of greatest sensitivity, the galvanometer deflection is zero. It will be noted that this position of contact 36a is not necessarily at the midpoint of resistor 36, but at such a point that it exactly compensates for all unbalance and dissymmetry in the system.

Sensitivity of the galvanometer 38 is then finely adjusted by means of movable contact 37a.

If the biasing system, including components 15 to 23 inclusive be permitted to operate, by the closing of the switch 23b, it will be seen that a full-wave rectified voltage is impressed on the resistor 15. Its frequency is identical with that of the signal voltage impressed across the terminals 1 and 2. Similarly, a half-wave rectified voltage of identical frequency is impressed across the resistor 16. This voltage is substantially displaced in phase from the full-wave rectified voltage, due to the presence of condenser 22 in the primary circuit of transformer 21.

The phase relations of these two auxiliary rectified voltages are together widely adjustable with respect to the signal voltage to be investigated, by means of the phase shifting device 23, and their magnitudes may be controlled by the potentiometer 23a, though, as above stated, their relative phase displacement and their relative magnitudes are fixed. The magnitude of the half-wave rectified voltage should be of the same order as that of the full-wave rectified voltage though it is by no means necessary that these magnitudes be alike. The phase of the half-wave rectified voltage should be substantially displaced from that of the full-wave rectified voltage though it is by no means necessary that the phase displacement be 90 degrees.

Fig. 3 shows the effect of adding a full-wave rectified voltage and a half-wave rectified voltage substantially displaced in phase from each other. In Fig. 3, curve A shows the wave form of the full-wave rectified voltage and curve B that of the half-wave rectified voltage. Curve B is shown as displaced substantially 90 degrees in phase from curve A but as above stated this is not essential. In curve C the ordinates of curves A and B have been added.

Since, as above stated, these two rectified voltages A and B are placed in series by means of resistors 15 and 16 and then impressed upon the grids 8 and 9 in parallel, curve C represents the resulting potential of both the grids 8 and 9. It will be seen that this grid potential approaches a zero value sharply and for one brief interval per cycle, having a large negative value throughout the remainder of the cycle. This operates to bias both the grids below cut-off during the greater part of the cycle and permits a plate current to flow only during the brief interval in which the grids are not so biased below cut-off.

The effect of this biasing means is the same, during the intervals of interest, as that of a full wave rectified voltage obtained from an alternating current source having a frequency one-half that of the supply line 4. Such a full wave rectified voltage is shown in Fig. 2 by the curve D. The rectifier system of Fig. 1 is preferred for the reason that it provides a simple and inexpensive means of obtaining a bias voltage which shall have a large negative value except during one brief interval per cycle, without the necessity of a frequency divider, or of a second source of lower frequency.

It will be evident that the breadth of the interval during which the tube is conductive is determined by the magnitude of the rectified voltages, which can be manually controlled by potentiometer 23a.

Assuming that the instant of activity of grid 8 occurs while the signal voltage impressed on terminals 1 and 2 is positive with respect thereto, Fig. 4 shows the actual potential of this grid 8 which results from the addition of the biasing voltage and the signal voltage. It will be seen that with phase relations as shown, the net grid potential is biased below cut-off for the major portion of each cycle (except when the bias curve rises to the cathode potential lines). Under the same phase conditions the potential of grid 9, illustrated in Fig. 5, is biased below cathode potential at all times, since the signal voltage is negative during the brief interval at which the bias arrives at the cathode potential line.

These conditions operate to prevent a plate-current flow in the circuit of plate 25 at all times and to permit a flow of current in the circuit of plate 24 only during the said brief intervals. This tube 10 operates as a detector, and the waveform of the resulting plate current is in the nature of a positive point impulse and is indicated by curve E in Fig. 6. It will be clear that the magnitudes of these point impulses of plate current are directly related to the magnitude of the signal voltage at the particular instants at which the plate 24 is rendered conductive by reduction of the biasing voltage on grid 8. Therefore, if by adjustment of the phase-shifting device 23 the phase of the biasing voltage is shifted with respect to the signal voltage, the grid 8 will permit current to flow to plate 24 at a different instant and positive point impulses of different magnitude will result in the circuit of plate 24. Such point impulses of altered phase and reduced magnitude are illustrated by the dotted curve F of Fig. 6, obtained by shifting the biasing voltage roughly 60 degrees in phase from the position in which curve E was obtained.

When the phase of the biasing voltage is shifted 90 degrees from the position shown in Fig. 4, the conductive periods of both plates occur when the signal voltage is zero, and no plate current change occurs in either plate circuit. When the shift is more than 90 degrees, the plate 25 becomes the conductive one, the plate 24 being non-conductive.

The point impulses of plate current may well be of considerable magnitude, and if the resulting voltage were impressed on the grids of tube 31 without alteration, might overload the latter without producing correction deflection at the meter 38 due to the inability of the meter to follow the extremely short electric fluctuations. I therefore prefer to slope the plate voltage impulses off as shown in Fig. 7. This is accomplished by the use of condensers 28 and 29 connected as shown. The point impulses of plate current serve to charge these condensers almost instantaneously once per cycle, and they are thereafter discharged through the resistors 26 and 27 during the remainder of each cycle.

It will be seen that this resulting voltage, which is of a saw-tooth wave form, has a direct current component, that is to say, an average value different from zero. This is due to the fact that the positive point impulses of one plate of the tube 10 are not neutralized by equal and opposite impulses in the circuit of the other plate; and this is due in turn to the fact that on grid 8 the signal voltage is added to the biasing voltage, whereas on grid 9 it is subtracted therefrom.

The saw-tooth voltage of Fig. 7 is impressed directly between the grids 32 and 33 of the tube 31. In general, both its direct current component and its alternating current component will be amplified by the action of this tube, and the resulting amplified plate voltage impressed without alteration of wave form across the plate resistor 36. Since the galvanometer does not respond to the alternating current component, it may be preferred, in order to obtain increased sensitivity, to rectify the alternating current component, at least in part. This may be accomplished through the medium of resistors 26 and 27, since the normal plate currents of the tube 10 produce a voltage drop between cathode and each grid of tube 31. By proper choice of these resistors and of the operating potential of tube 31 this voltage drop may be adjusted to bias the grids 32 and 33 at or close to cut-off. In this event, the alternating component of the voltage across the resistors 26 and 27 will be rectified by the tube 31 and the voltage across the resistor 36 will comprise this rectified voltage as well as the amplified direct component across the resistors 26 and 27.

The voltage drop across the resistor 36 is impressed through the resistor 37 and the movable contact 37a on the galvanometer 38 and causes a deflection thereof.

The deflection of the galvanometer 38 may, if desired, be taken as an indication of the instantaneous magnitude of the signal voltage impressed on terminals 1, 2. This galvanometer deflection will be directly proportional to such voltage if and only if the tube 31 operates as a linear amplifier and the tube 10 as a linear detector, and if not, the resulting wave form will be distorted. These conditions are easy to obtain over limited voltage ranges but difficult to obtain over wide ranges. Since in many applications it may be desirable that the apparatus as a whole be linear over extremely wide ranges of signal voltage, I prefer to employ the balancing circuit, comprising components 11 to 14, inclusive, of Fig. 1, which enables me to read zeros on galvanometer 38 at all times.

The operation of this balancing circuit will now be described.

Adjustment of the position of the sliding contact 13b places a direct voltage across resistor 12. Since the sliding contact 13b may be moved from one end of resistor 13 to the other, past the center tap, this voltage may be adjusted from a fairly high value through zero to a negative value of the same magnitude. This voltage is in series with the signal voltage, and, when the switch 41 is thrown to the left, it is impressed between the grids 8 and 9. In view of the biasing circuit above-described, however, this grid voltage has no effect on the plate current of tube 10 except during the one brief interval per cycle in which the signal voltage also has its effect, and it is therefore equivalent to an impulse of like character. Adjustment of the sliding contact 13b either adds this voltage to the voltages already impressed on the grids 8 and 9 or subtracts it therefrom, resulting in an increase or a decrease in the deflection of the galvanometer. For any setting of phase shifter 23 a position may be found for movable contact 13b such that the impulses due to source 14 and resistor 12 are exactly equal and opposite to those due to the signal voltage. This results in reducing the galvanometer deflection to zero. Since the ordinate of the wave form under investigation is for any phase condition, directly proportional to the magnitude of the impulse due to the signal voltage, it is also directly proportional to the magnitude of the equal and opposite impulse due to source 14 and resistor 12; and this magnitude may in turn be read on voltmeter 11. Thus, by setting phase shifter 23 successively to different positions preferably at equal phase intervals throughout a full revolution, balancing the galvanometer 38 for each such position by adjustment of movable contact 13b, and plotting the null readings of voltmeter 11 against the dial readings of phase shifter 23, the complete wave form under investigation may be obtained.

I will now describe in detail the performance of a wave-form determination according to the methods and with the apparatus of my invention.

With the switch 41 thrown to the right and the switch 23b closed, and with the movable contacts 37a set for maximum galvanometer sensitivity I adjust the contact 36a until the galvanometer 38 shows a minute deflection in either direction. I then adjust contact 40a until the deflection has reached a maximum value. The operating potentials of the electrodes of tubes 10 and 31 will then be such as to result in maximum sensitivity of the apparatus as a whole.

Then, by movement only of movable contact 36a, I reduce the galvanometer deflection to zero. The apparatus as a whole is now adjusted for balance.

I next protect the galvanometer 38 from a large surge by moving slider 37a to the right, close switch 23b and adjust movable contact 13b until voltmeter 11 reads zero. I then move slider 37a to the left, increasing the galvanometer sensitivity until the galvanometer needle shows a large deflection. By movement of slider 13b I reduce this deflection to zero. I then move slider 37a until the galvanometer again shows a deflection, and again reduce it to zero by adjustment of slider 13b, continuing this process until the sensitivity obtained is as great as desired. I then note the reading of the dial of the phase shifter 23 and of the voltmeter 11.

The setting of the phase shifter 23 is now altered, say by 5 or 10 degrees, and a new pair of readings taken. The whole process is then repeated at equal phase intervals, say of 5 or 10 degrees, until a full cycle has been investigated.

If the utmost sensitivity is desired, it may be necessary to reduce the galvanometer sensitivity by moving the slider 37a to the right before altering the setting of the phase shifter 23. Excellent results, however, can be obtained by leaving the slider 37a at such a position that a shift of 5 or 10 degrees in the setting of phase shifter 23 will not throw the galvanometer needle off scale. Under these conditions, successive readings of phase and voltage may be taken without touching the slider 37a. If, then, after the full wave has been recorded and plotted, it should be desired to obtain increased accuracy as to some particular portion thereof, the phase shifter 23 can be reset to the proper phase value and the slider 13b carefully adjusted to give zero deflection of the galvanometer even at full extension of the slider 37a.

Due to the use of this null method and the components 11 to 14, inclusive, non-linearities of the vacuum tubes 10 and 31 do not interfere with the accuracy of the results in the slightest degree, since when a reading is taken both tubes are always balanced, and it is of no consequence that the balance points may occur on a curved portion of the characteristic of either tube.

It is because of this fact that I am enabled to take advantage of the high amplification obtainable with a slightly positive grid. As above explained, the potential on one of the grids of the tube 10 will rise above zero by the amount of the signal voltage once per cycle; and the potential of one of the grids of the tube 31 will rise above its normal operating value in the same way by a greater amount due to amplification. This will result in a greater amplification factor for each tube than would exist were it biased exactly at cut-off.

It must be borne in mind, however, that a fundamental requirement for successful operation of the device is that the tube 10 act as a detector. If too great a degree of amplification be sought from tube 10, this may be at the expense of its detector efficiency. It may therefore be advisable in some cases to provide the grids 8 and 9 with a fixed bias in order that the tube 10 shall operate at or near cut-off. This fixed grid bias may easily be obtained by inserting a small battery in series between the cathodes 17 and the resistor 16 of Fig. 1. I have found, however, that the apparatus operates excellently without the assistance of this bias and it has therefore been omitted from the drawings.

An additional matter of importance in connection with the circuit arrangement of Fig. 1 is the highly desirable sensitivity characteristic which results from the connections of the tubes 10 and 31. It will be seen that the greater the impulsive voltage on the grid 8, and, therefore, the greater the voltage drop across resistors 26 and 27, the greater will be the negative bias of the grid 32. This results in reducing the amplification factor of the tube 31 in proportion as the signal on it is increased. The same, of course, is true as regards grid 9 and grid 33. This provides an extremely wide range for the apparatus as a whole and also serves to protect the galvanometer from large surges without in any way reducing its sensitivity to the minute signals which exist when the null method is employed.

Although I have described my invention in terms of an embodiment especially adapted for the determination of a voltage wave form, it will be evident that it is equally well adapted to the determination of the wave form of any alternating quantity. As those skilled in the art are well aware, many phenomena, such as mechanical vibrations, etc., may be given replicas in the form of electric voltages, and their wave forms determined by the use of my invention. The same is even more obviously true of the wave form of an electric current which it may be desired to determine.

Having now described my invention, I claim:

1. A method of wave-form determination which comprises impressing a signal voltage on the input terminals of a circuit, and determining the resultant current flow during different instants of a cycle of the resulting current by introducing a bias voltage in the circuit sufficient to prevent the flow of current past a point in said circuit, reducing said bias voltage for a brief interval at corresponding instants in successive cycles of the signal voltage to permit a flow of current past the point in said circuit, and determining the current flow past the point in said circuit when said bias voltage is reduced.

2. A method of wave-form determination which comprises impressing a signal voltage on the input terminals of a circuit, and determining the resultant current flow during different instants of a cycle of the resulting current by introducing into the circuit a bias voltage sufficient to prevent the flow of current past a point in said circuit, reducing said bias voltage for a brief interval at corresponding instants in successive cycles of the signal voltage and determining the current flow past the point in said circuit when said bias voltage is reduced.

3. A method of wave-form determination which comprises impressing a signal voltage on the input terminals of a circuit, and determining the resultant current flow during different instants of a cycle of the resulting current by introducing into the circuit a rectified alternating bias voltage having a maximum amplitude sufficient to prevent the flow of current past a point in the circuit and a minimum amplitude such that current is permitted to flow past said point, and determining the flow of current past said point when the bias voltage is at its minimum.

4. A method of wave-form determination according to claim 3 in which the bias voltage is obtained by full-wave rectification of an alternating current having a frequency half that of the signal voltage.

5. A method of wave-form determination according to claim 3 in which the bias voltage is the sum of a full-wave rectified voltage and a half-wave rectified voltage of the same sign but displaced in phase from each other.

6. In wave-form determination of a signal voltage by determining a series of instantaneous values of the signal voltage in a circuit, the improvement which comprises introducing into the circuit a bias voltage of variable magnitude such that current is prevented from passing a point in the circuit except during brief corresponding intervals in successive cycles of the signal voltage, determining the current flow past the point during said brief intervals, shifting the phase relationship of the bias voltage with respect to the signal voltage to obtain new brief intervals, and thereafter determining the current flow past the point during said new brief intervals.

7. In wave-form determination of a signal voltage by determining a series of instantaneous values of the signal voltage in a circuit, the improvement which comprises simultaneously introducing into said circuit a bias voltage of constant sign but varying magnitude, maintaining the magnitude of the bias voltage sufficiently high to prevent the passage of current past a point in said circuit except during brief corresponding intervals in successive cycles of the signal voltage, determining the flow of current past said point during said brief intervals, introducing into the circuit an auxiliary voltage in amount sufficient to balance the signal voltage during said brief intervals and determining the magnitude of the auxiliary voltage thus introduced.

8. In determining the wave form of a signal voltage introduced in a first circuit, by determining a series of instantaneous values of the signal voltage, the improvement which comprises simultaneously introducing into said circuit a bias voltage of constant sign but varying magnitude, maintaining the magnitude of the bias voltage sufficiently high to prevent the passage of current past a point in said circuit except during brief corresponding intervals in successive cycles of the signal voltage, determining the flow of current past said point during said brief intervals, introducing into the circuit an auxiliary voltage in amount sufficient to balance the signal voltage during said brief intervals, determining the magnitude of the auxiliary voltage thus introduced, shifting the phase of the bias voltage with respect to the signal voltage to obtain new brief intervals, altering the magnitude of the said auxiliary voltage to balance the signal voltage during said new brief intervals, and determining the magnitude of the auxiliary voltage as altered.

9. In apparatus for determining the wave form of electrical quantities, the improvement which comprises a vacuum tube detector having its input side connected to a first circuit and provided with an output circuit, means for impressing on said tube a bias voltage of varying magnitude such that the tube is rendered non-conductive except during brief corresponding intervals in successive cycles of the signal voltage, and means for measuring the output of the tube during said intervals.

10. Apparatus according to claim 9 provided with means for shifting the phase of the bias voltage with respect to the signal voltage.

11. Apparatus according to claim 9 provided with means for introducing an auxiliary direct current potential in the first circuit and means for measuring the auxiliary potential thus introduced.

12. In apparatus for determining the wave form of an electrical quantity, having a first circuit and an output circuit and means for introducing into said first circuit a signal voltage to be investigated, the improvement which comprises a vacuum tube detector provided with a cathode, a grid connected to the first circuit and a plate connected to said output circuit, means for producing and introducing into the first circuit a bias voltage sufficient to render the tube non-conductive except during brief corresponding intervals in successive cycles of the signal voltage, said means for producing the bias voltage comprising a full-wave rectifier tube and a half-wave rectifier tube coupled on their input sides through phase displacing means and means for determining the plate current output during the intervals when the tube is conductive.

13. Apparatus according to claim 12 provided with means for introducing an auxiliary direct current voltage into the first circuit to balance the signal voltage during the intervals in which the tube is conductive, and means for regulating the magnitude and sign of said auxiliary voltage.

14. Apparatus according to claim 12 provided with means for shifting the phase of the bias voltage with respect to the signal voltage.

15. A method of determining the wave-form of an alternating electrical quantity which comprises utilizing said alternating electrical quantity to provide a signal voltage, impressing said signal voltage on the input terminals of a first circuit, introducing a first auxiliary alternating voltage in said first circuit, said auxiliary voltage having a sharp-peaked wave form and a frequency equal to the frequency of said signal voltage, and a certain phase, combining said signal voltage with said auxiliary voltage, rectifying said combined voltages to provide a first impulsive voltage in a second circuit, said impulses being related to the magnitude of said signal voltage at the phase of said auxiliary voltage, providing a second auxiliary direct current voltage in said first circuit, combining said second auxiliary voltage with said first auxiliary voltage to provide a second impulsive voltage in said second circuit, and adjusting the phase of said first auxiliary voltage and the magnitude of said second auxiliary voltage to balance said first impulsive voltage against said second impulsive voltage.

16. Apparatus for determining the wave form of an alternating electrical signal voltage, which comprises in combination a source of said signal voltage, a first circuit connected to said source, a phase-shifting device connected to said source, a full-wave rectifier and a half-wave rectifier connected together through phase-displacing means, and connected on their input sides to said phase-shifting device and on their output sides to said first circuit, a detector having input terminals connected to said first circuit and output terminals connected to said second circuit, a second circuit, a source of auxiliary direct current voltage connected to said first circuit, means for combining the output voltages of said rectifier to provide an alternating bias voltage in said first circuit having a sharp-peaked wave-form, and a certain phase, means for biasing said detector in related accordance with said bias voltage, means for combining said signal voltage with said auxiliary voltage in said first circuit, means for shifting the phase of said bias voltage, means for regulating the magnitude and sign of said auxiliary direct current voltage, and indicating means responsive to direct current in said second circuit.

17. Apparatus for determining the wave form of an electrical signal voltage which comprises in combination a balanced vacuum tube detector having control grids, means for impressing said signal voltage on the grids of the balanced vacuum tube detector, rectifier biasing means for rendering said tube non-conductive except during one brief interval per cycle of said signal voltage, means for controlling the phase angle at which said interval occurs, indicator means responsive to direct current in the output circuit of said detector, means for maintaining a constant average potential difference of adjustable magnitude between the grids of said detector, and means for indicating the magnitude of said potential difference.

18. Apparatus for determining the wave form of an electrical signal voltage which comprises in combination a vacuum tube detector having a grid and a cathode, means for impressing said signal voltage between the grid and the cathode of the vacuum tube detector, rectifier biasing means for rendering said tube non-conductive except during one brief interval per cycle of said signal voltage, means for controlling the phase at which said interval occurs, indicator means responsive to direct current in the output circuit of said detector, means for impressing a constant direct current voltage of adjustable magnitude between the grid and the cathode of said detector, and means for indicating the magnitude of the direct current voltage.

19. Apparatus for determining the wave form of an electrical signal voltage which comprises in combination a balanced vacuum tube detector having control grids, means for impressing said signal voltage on the grids of the balanced vacuum tube detector, biasing means including a full-wave rectifier and a half-wave rectifier for rendering said tube non-conductive except during one brief interval per cycle of said signal voltage, means for controlling the phase at which said interval occurs, indicator means responsive to direct current in the output circuit of said detector, means for impressing a constant direct current voltage of adjustable magnitude in series with said signal voltage, and means for indicating the magnitude of said direct current voltage.

20. In apparatus of the class described, the combination of a source of signal voltage, means for producing a direct current voltage of adjustable magnitude, a detector having an input circuit and an output circuit, a full-wave rectifier and a half-wave rectifier, connected on their input sides to said source and on their output sides to the input circuit of said detector, means for combining the output voltages of said rectifiers, means for biasing the input circuit of said detector in accordance with said combined output voltages of said rectifiers, means for impressing said signal voltage and said direct current voltage in series on the input circuit of said detector, and indicating means responsive to direct current connected in the output circuit of said detector.

21. In apparatus for wave form determination, the combination of a source of signal voltage, a balanced vacuum tube detector having two control grids, an input circuit, and an output circuit, means for impressing a signal voltage across the grids of said detector, a full-wave rectifier and a half-wave rectifier connected on their input sides to said source, means for combining the output voltages of said rectifiers, and means for biasing the grids of said detector in accordance with said combined voltages, whereby said detector is rendered responsive to said signal voltage during only one brief interval per cycle.

THEODOR ZUSCHLAG.